(12) United States Patent
Wang et al.

(10) Patent No.: US 11,946,833 B2
(45) Date of Patent: Apr. 2, 2024

(54) TEST ASSEMBLY AND TEST TOOLING

(71) Applicant: CONTEMPORARY AMPEREX TECHNOLOGY CO., LIMITED, Ningde (CN)

(72) Inventors: Jia Wang, Ningde (CN); Zhihui Wang, Ningde (CN); Wu Lin, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 18/342,746

(22) Filed: Jun. 28, 2023

(65) Prior Publication Data

US 2023/0341297 A1   Oct. 26, 2023

Related U.S. Application Data

(63) Continuation of application No. PCT/CN2022/100403, filed on Jun. 22, 2022.

(30) Foreign Application Priority Data

Sep. 24, 2021   (CN) .......................... 202122320528.5

(51) Int. Cl.
   *G01M 99/00*   (2011.01)
(52) U.S. Cl.
   CPC .................................. *G01M 99/00* (2013.01)
(58) Field of Classification Search
   CPC .................................................... G01M 99/00
   See application file for complete search history.

(56) References Cited

U.S. PATENT DOCUMENTS

5,722,947 A    3/1998   Jeppsson et al.

FOREIGN PATENT DOCUMENTS

| CN | 101975663 A | 2/2011 |
| CN | 203365330 U | 12/2013 |
| CN | 209933632 U | 1/2020 |
| CN | 111380660 A | * 7/2020 |
| CN | 211235693 U | 8/2020 |

(Continued)

OTHER PUBLICATIONS

Machine translation of CN 211740293 (Year: 2020).*

(Continued)

*Primary Examiner* — Natalie Huls
(74) *Attorney, Agent, or Firm* — Kilpatrick Townsend & Stockton LLP

(57) ABSTRACT

Provided are a test assembly and a test tooling, including: interfaces, where one end of the interface is configured to connect a device under test, and the interfaces include a first interface and a second interface; a first three-way valve, where the first three-way valve includes a first cut-in valve, a first vent valve, and a first test valve, another end of the first interface is connected to the first cut-in valve, and the first vent valve lets in atmospheric air and is able to open and close; a second three-way valve, where the second three-way valve includes a second cut-in valve, a second vent valve, and a second test valve, another end of the second interface is connected to the second cut-in valve, and the second vent valve lets in atmospheric air and is able to open and close; and a manifold.

8 Claims, 2 Drawing Sheets

(56) References Cited

FOREIGN PATENT DOCUMENTS

| CN | 211740293 | U |   | 10/2020 | | |
|----|-----------|---|---|---------|---|---|
| CN | 112345373 | A | * | 2/2021  | .......... | G01M 3/3272 |
| CN | 213363969 | U |   | 6/2021  | | |
| CN | 215952668 | U |   | 3/2022  | | |
| EP | 0559972   | A2|   | 9/1993  | | |

OTHER PUBLICATIONS

International Search Report received in the corresponding International Application PCT/CN2022/100403, mailed Sep. 28, 2022.
Written Opinion received in the corresponding International Application PCT/CN2022/100403, mailed Sep. 28, 2022.

* cited by examiner

TEST ASSEMBLY AND TEST TOOLING

CROSS-REFERENCE TO RELATED APPLICATIONS

This application is a continuation of International Application PCT/CN2022/100403, filed Jun. 22, 2022, which claims priority to Chinese Patent Application No. 202122320528.5, filed with the China National Intellectual Property Administration on Sep. 24, 2021 and entitled "TEST ASSEMBLY AND TEST TOOLING", which are incorporated herein by reference in their entireties.

TECHNICAL FIELD

This application relates to the field of flow monitoring, and in particular, to a test tooling.

BACKGROUND

At present, environmental and energy issues make social progress face a serious situation. Low carbon and environmental protection have become a major theme of future economic development. The storage and efficient utilization of energy have attracted widespread attention, and lithium-ion battery units exist as the smallest unit for energy storage. Energy conservation and emission reduction are crucial to the sustainable development of the automotive industry. Electric vehicles, with their advantages in energy conservation and emission reduction, have become an important part of sustainable development of the automobile industry. For electric vehicles, battery technology is an important factor in connection with their development. Battery is a structure in which multiple battery cells are effectively connected. A specific number of battery cells are connected in series/parallel/series-parallel to meet the demand of power supply for electric devices. During production of battery cells, the analysis tooling needs to analyze electrolyte by suction, so how the performance of suction inlets of an analysis tooling is tested is an urgent problem that needs to be solved.

SUMMARY

This application provides a test assembly and a test tooling which can intensively test the performance of suction inlets of an analysis tooling.

This application is implemented as follows. A test assembly includes:
interfaces, where one end of the interface is configured to connect a device under test, and the interfaces include a first interface and a second interface;
a first three-way valve, where the first three-way valve includes a first cut-in valve, a first vent valve, and a first test valve, another end of the first interface is connected to the first cut-in valve, and the first vent valve lets in atmospheric air and is able to open and close; a second three-way valve, where the second three-way valve includes a second cut-in valve, a second vent valve, and a second test valve, another end of the second interface is connected to the second cut-in valve, and the second vent valve lets in atmospheric air and is able to open and close; a manifold, where the first test valve is connected to the manifold and the second test valve is connected to the manifold; and a sensor, where the manifold is connected to a test end of the sensor.

In the technical solution of the embodiments of this application, the first interface and the second interface can be used to connect to different gas paths of the device under test. Each gas path is connected to one three-way valve and each three-way valve has one valve letting in atmospheric air, one valve connected to an interface, and one valve connected to a test device. The valve connected to the test device is connected to the test device, such as a sensor, through the manifold. When different gas paths need to be tested, the valves are controlled such that a valve letting in atmospheric air of a three-way valve corresponding to a gas path under test is closed and a valve letting in atmospheric air of the other gas path is open. In this way, whether air pressure in the current gas path is normal can be measured. With the manifold used, the foregoing solution well implements the technical effect of using one sensor to test the flows in gas paths of the device under test.

In one aspect of this solution, the first cut-in valve and the first test valve have equal diameters. With the first cut-in valve and the first test valve designed to have equal diameters, the stability of gas flow in the three-way valve can be ensured, avoiding pressure changes caused by unequal gas flow in and out and ensuring the accuracy and stability of test data.

In another aspect of this solution, diameter of the manifold is more than 5 times diameter of the first test valve. With the diameter of the manifold increased, the impact caused by convergence of gases from multiple paths is avoided when the test tooling is working, ensuring the stability of gas flow and reducing gas disturbance in the manifold. Thereby the measurement accuracy is improved.

In another aspect of this solution, the manifold includes a manifold chamber, and diameter of the manifold chamber is more than 5 times the diameter of the first test valve. With a manifold chamber of a large diameter specially provided in the manifold, the impact caused by convergence of gases from multiple paths is avoided, ensuring the stability of gas flow and reducing gas disturbance in the manifold. Thereby the measurement accuracy is improved.

In another aspect of this solution, a plurality of interfaces and at least as many three-way valves as the interfaces are included, where each of the three-way valves includes a cut-in valve, a vent valve and a test valve, the cut-in valve of each three-way valve is configured to connect to a respective interface, the vent valve of each three-way valve is configured to let in atmospheric air and is able to open and close, and the test valve of each three-way valve is configured to connect to the manifold. The provision of a plurality of interfaces and a plurality of three-way valves allows the test assembly to connect to more negative pressure ports of the device under test at the same time, improving the test efficiency.

In another aspect of this solution, a control unit is included, where the control unit is configured to control the vent valve of each three-way valve to open and close. When the vent valve of each three-way valve opens, the three-way valve is open to the atmosphere and its test valve is unable to work. With the control unit used to control the vent valves of the three-way valves to open and close, switching between operating states of different test valves can be realized, thus achieving time division multiplexing for test of multiple gas paths.

In another aspect of this solution, a negative pressure gauge is included, where the negative pressure gauge is connected to the test end of the sensor. With the negative pressure gauge connected to the test end, the gas in the manifold can also be connected to the negative pressure gauge for testing negative pressure. Thus, the technical effect of displaying a negative pressure value of the gas path is achieved.

In another aspect of this solution, a box is included, where the test assembly described above is disposed inside the box. Loading the test assembly into the box enables components of the test assembly to be fixed relative to the box, achieving the technical effect of protecting the components from being damaged. Meanwhile, the box being used for uniform packaging also facilitates the convenience of carrying.

In another aspect of this solution, a box wall of the box further includes openings and gas-guiding pipes, where the openings are connected to the interfaces via the gas-guiding pipes. The provision of the openings and the gas-guiding pipes allows working sites of different interfaces to correspond to different openings. In actual use, the openings can be connected to connecting pipes of different interfaces of the device under test. With the connecting pipes connected according to an association mapping, measurement for different interfaces of the device under test can be performed in turn. The foregoing solution makes it easy for a user to connect the device under test.

In another aspect of this solution, more than two test assemblies are disposed inside the box. Each test assembly has multiple interfaces connected to multiple three-way valves and one same sensor, thus achieving the technical effect of saving sensors. At maximum, up to 24 interfaces and 24 three-way valves can be connected to one sensor at the same time. In one same box, alternatively, 2 to 3 test assemblies may be disposed, in which case test tasks for tens of interfaces can be processed at the same time, greatly improving test efficiency of the test tooling.

The foregoing description is merely an overview of the technical solution of this application. For a better understanding of the technical means in this application such that they can be implemented according to the content of the specification, and to make the above and other objectives, features and advantages of this application more obvious and easier to understand, the following describes specific embodiments of this application.

BRIEF DESCRIPTION OF DRAWINGS

Persons of ordinary skill in the art can clearly understand various other advantages and benefits by reading the detailed description of the preferred embodiments below. The accompanying drawings are merely intended to illustrate the preferred embodiments and are not intended to limit this application. In addition, in all the accompanying drawings, same parts are indicated by same accompanying symbols. In the accompanying drawings.

Figure 1:
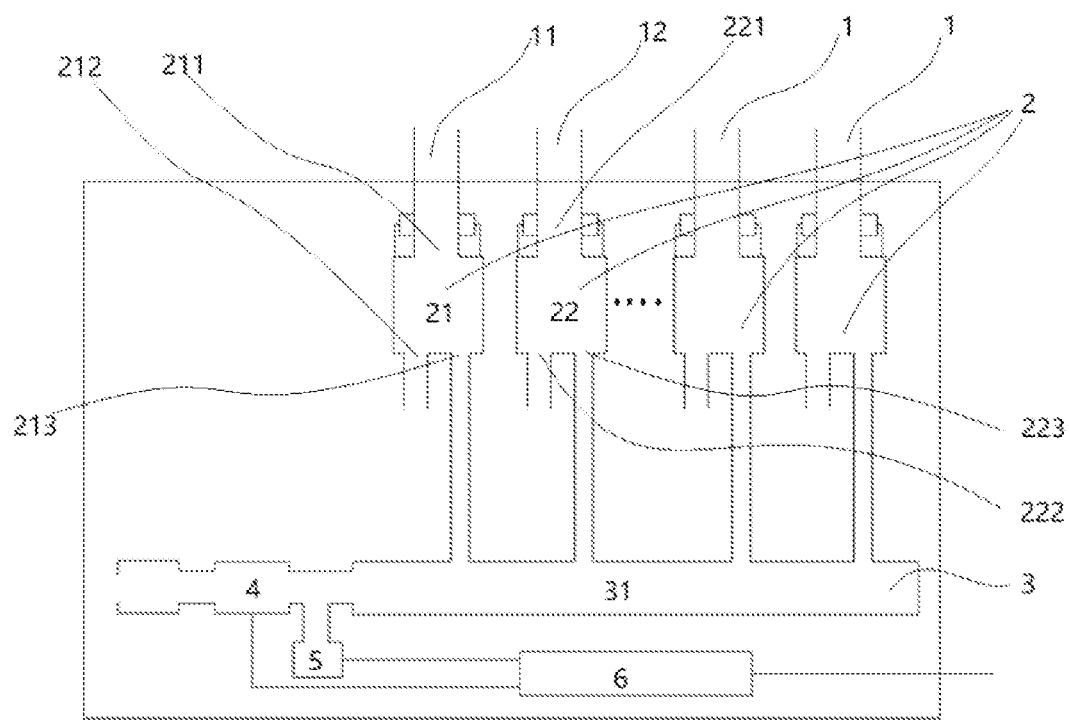
FIG. 1 is a schematic diagram of a test assembly according to an embodiment of this application.

DESCRIPTION OF REFERENCE SIGNS 1. interface;
11. first interface;
12. second interface;
2. three-way valve;
21. first three-way valve;
211. first cut-in valve;
212. first vent valve;
213. first test valve;
22. second three-way valve;
221. second cut-in valve;
222. second vent valve;
223. second test valve;
3. manifold;
31. manifold chamber;
4. sensor;
5. negative pressure gauge;
6. control unit;
7. box; and
71. opening.

DESCRIPTION OF EMBODIMENTS

The following describes in detail the embodiments of technical solutions in this application with reference to the accompanying drawings. The following embodiments are merely used to describe technical solutions in this application more explicitly, and therefore they are merely used as examples and do not constitute a limitation to the protection scope of this application.

Unless otherwise defined, all technical and scientific terms used herein shall have the same meanings as commonly understood by those skilled in the art to which this application belongs. The terms used herein are merely intended to describe the specific embodiments rather than to constitute any limitation on this application. The terms "include", "comprise", and "have" and any other variations thereof in the specification, the claims and the foregoing brief description of drawings of this application are intended to cover non-exclusive inclusions.

In descriptions of embodiments of this application, the terms "first", "second" and the like are merely intended to distinguish between different objects, and shall not be understood as any indication or implication of relative importance or any implicit indication of the number, specific sequence or primary-secondary relationship of the technical features indicated. In the descriptions of this application, "a plurality of" means at least two unless otherwise specifically stated.

In this specification, reference to "embodiment" means that specific features, structures or characteristics described with reference to the embodiment may be incorporated in at least one embodiment of this application. The word "embodiment" appearing in various places in the specification does not necessarily refer to the same embodiment or an independent or alternative embodiment that is exclusive of other embodiments. Persons skilled in the art explicitly and implicitly understand that the embodiments described herein may combine with other embodiments.

In the descriptions of embodiments of this application, the term "and/or" in this application describes only an association relationship for describing associated objects and represents that three relationships may be present. For example, A and/or B may represent the presence of the three cases: A alone, both A and B, and B alone. In addition, a character "I" in this specification generally indicates an "or" relationship between contextually associated objects.

In the description of the embodiments of this application, the term "a plurality of" means more than two (inclusive). Similarly, "a plurality of groups" means more than two (inclusive) groups, and "a plurality of pieces" means more than two (inclusive) pieces.

In the description of the embodiments of this application, the orientations or positional relationships indicated by the technical terms "center", "longitudinal", "transverse", "length", "width", "thickness", "upper", "lower", "front", "rear", "left", "right", "perpendicular", "horizontal", "top", "bottom", "inside", "outside", "clockwise", "counterclockwise", "axial", "radial", "circumferential", and the like are based on the orientations or positional relationships as shown in the accompanying drawings. These terms are merely for ease and brevity of description of the embodiments of this application rather than indicating or implying that the apparatuses or components mentioned must have specific orientations or must be constructed or manipulated according to specific orientations, and therefore shall not be construed as any limitations on embodiments of this application.

In the description of the embodiments of this application, unless otherwise specified and defined explicitly, the terms "mount", "connect", "join", and "fasten" should be understood in their general senses. For example, they may refer to a fixed connection, a detachable connection, or an integral connection, may refer to a mechanical connection or electrical connection, any may refer to a direct connection, an indirect connection via an intermediate medium, an internal communication between two elements or an interaction between two elements. Persons of ordinary skill in the art can understand specific meanings of these terms in this application as appropriate to specific situations.

At present, from the perspective of market development, application of traction batteries is becoming more and more extensive. Traction batteries have been widely used in energy storage power supply systems such as hydroelectric power plants, thermal power plants, wind power plants, and solar power plants, and many other fields including electric transportation tools such as electric bicycles, electric motorcycles, and electric vehicles, military equipment, and aerospace. With continuous expansion of application fields of traction batteries, market demands for traction batteries are also expanding.

The battery cell disclosed in the embodiments of this application may be used without limitation in electric apparatuses such as vehicles, ships, or aircrafts. The battery cell, the battery, and the like disclosed in this application may be used to constitute a power supply system of the electric apparatus. This helps relieve and automatically adjust deterioration in the swelling force of the cell, replenish electrolyte consumed, and improve stability of the performance and service life of the battery.

An embodiment of this application provides an electric apparatus that uses a battery as a power source. The electric apparatus may be but is not limited to a mobile phone, a tablet, a laptop computer, an electric toy, an electric tool, an electric bicycle, an electric vehicle, a ship, or a spacecraft. The electric toy may be a fixed or mobile electric toy, for example, a game console, an electric toy car, an electric toy ship, and an electric toy airplane. The spacecraft may include an airplane, a rocket, a space shuttle, a spaceship, and the like.

During preparation of secondary batteries, especially during preparation of lithium-ion secondary batteries, electrolyte needs to be treated. The applicant has noted that during electrolyte extraction and formation, a negative pressure tooling needs to produce negative pressure to suck the electrolyte. Therefore, the magnitude of negative pressure is an important factor affecting the amount of electrolyte sucked. The design of a test tooling for testing negative pressure performance of the negative pressure tooling that produces negative pressure is particularly important. Existing test toolings are typically connected directly to sensors at test interfaces, and each test interface is provided with at least one sensor. This design is neither scientific nor economical, especially in the current context of increased chip pricing, which will sharply increase production costs of test toolings. Therefore, how one-to-many multiplexing is realized for sensors is an urgent problem that needs to be solved.

Figure 2:
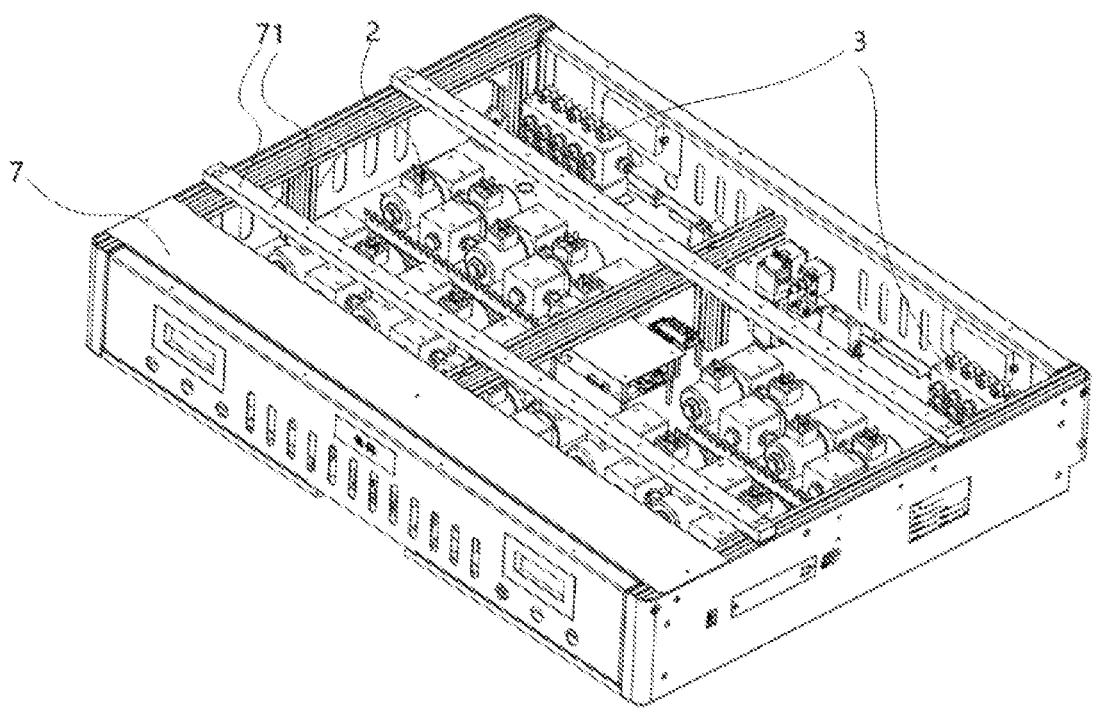
FIG. 2 is a schematic diagram of a test tooling according to an embodiment of this application.

Refer to FIG. 1 and FIG. 2. To solve the foregoing problem, the applicant provides a test assembly including interfaces 1, a first three-way valve 21, a second three-way valve 22, a manifold 3, and a sensor 4. One end of the interface 1 is configured to connect a device under test, and the interfaces 1 include a first interface 11 and a second interface 12.

The first three-way valve 21 includes a first cut-in valve 211, a first vent valve 212, and a first test valve 213, and another end of the first interface 11 is connected to the first cut-in valve 211, and the first vent valve 212 lets in atmospheric air and is able to open and close.

The second three-way valve 22 includes a second cut-in valve 221, a second vent valve 222, and a second test valve 223, and another end of the second interface 12 is connected to the second cut-in valve 221, and the second vent valve 222 lets in atmospheric air and is able to open and close.

The first test valve 213 is connected to the manifold 3 and the second test valve 223 is connected to the manifold 3. The manifold 3 is connected to a test end of the sensor 4.

The interface 1 is typically a hollow pipeline that can be connected to a negative pressure suction nozzle of the device under test. When the device has multiple negative pressure suction nozzles under test, multiple corresponding interfaces 1 can be provided. In this embodiment, the interfaces 1 include at least the first interface 11 and the second interface 12, or may include more interfaces. The first interface 11 and the second interface 12 are merely examples to show the connection relationship with the three-way valves 2.

The three-way valve 2 means a pipeline element having one bypass at the valve body and is typically provided with one inlet and two outlets. Each valve of the three-way valve 2 can be provided to be independently opened and closed. One inlet and two outlets of the first three-way valve 21 in this embodiment include the first cut-in valve 211, the first vent valve 212, and the first test valve 213. When connected to a negative pressure suction nozzle, the first cut-in valve 211 exhausts gas, and the first test valve 213 takes in gas.

In this example, at least the second vent valve 222 is provided to be able to open and close. The three-way valve 2 may be made of metal, plastic, or the like. The valves can be controlled to open and close by means of, for example, solenoid valves.

The manifold 3 is a pipeline element having multiple inlets and a single outlet, which can play a role in pooling fluids and balancing buffer pressure. The manifold 3 may be made of aluminum, iron, steel, alloy or other materials.

The sensor 4 is typically a sensing device capable of testing fluids, for example, a flowmeter or a pressure sensor, and can give a response signal when detecting a change in gas flow in the manifold 3.

Flowmeters are now widely used in industries such as oil and gas, petrochemical engineering, water treatment, food and beverage, pharmaceuticals, energy, metallurgy, pulp and paper and building materials. Flowmeters are further divided into differential pressure flowmeters, rotor flowmeters, throttling flowmeters, slit flowmeters, volumetric flowmeters, electromagnetic flowmeters, ultrasonic flowmeters, and others. By medium, flowmeters are classified into liquid flowmeters and gas flowmeters. Implemented as a flowmeter, the sensor 4 can give a response signal of changing in gas flow when gas flow in the manifold 3 changes.

Pressure sensors, such as barometric pressure sensors, are instruments used to measure absolute pressure of gas, mainly for use in physical experiments related to gas pressure, such as gas laws, and for measuring pressure of dry and non-corrosive gas in biological and chemical experiments. For high-precision barometric pressure sensors, generally, MEMS technology is used to process a vacuum chamber and a Wheatstone bridge on a monocrystalline silicon chip. Output voltage at two legs of the Wheatstone bridge is proportional to the stress applied. Temperature compensated and calibrated, the high-precision barometric pressure sensor is characterized by small size, high accuracy, fast response time and freedom from impact by temperature changes. Two output modes are typically provided which are analog voltage output and digital signal output, where digital signal output is the current mainstream of use for convenience of connecting a microcontroller. Implemented as a pressure sensor, the sensor 4 can give a response signal of changing in the absolute value of air pressure when gas flow in the manifold 3 changes.

In the technical solution of the embodiments of this application, the first interface 11 and the second interface 12 can be used to connect different gas paths of the device under test. Under normal conditions, a gas path of the device under test is from a negative pressure suction nozzle capable of producing negative pressure. Each gas path is connected to one three-way valve 2 after being connected to an interface 1, and each three-way valve 2 has one valve letting in atmospheric air, one valve connected to an interface 1, and one valve connected to a test device. The valve connected to the test device is connected to the sensor 4 through the manifold 3.

When different gas paths need to be tested, the valves are controlled such that a valve letting in atmospheric air of a three-way valve 2 corresponding to a gas path under test is closed and a valve letting in atmospheric air of the other gas path is open. If the gas path of the device under test is able to produce negative pressure, air pressure in the three-way valve 2 is reduced and there is gas flowing through the sensor 4. In this way, whether air pressure in the current gas path of the device under test is normal can be measured. When it is necessary to switch to testing another gas path, a valve letting in atmospheric air of a three-way valve 2 corresponding to the gas path under test changes to closed, and then air pressure of a corresponding three-way valve 2 is reduced when the switched-to gas path is able to work properly.

With the foregoing test assembly, gases can be collected by the manifold 3, achieving the technical effect of using one sensor 4 to test the flows in gas paths of the device under test.

Refer to FIG. 1. In some embodiments of this solution, the first cut-in valve 211 and the first test valve 213 have equal diameters. When working, the valve letting in atmospheric air of the three-way valve 2 is closed, and the first cut-in valve 211 and the first test valve 213 are working. With the first cut-in valve 211 and the first test valve 213 designed to have equal diameters, gas flow through the first cut-in valve 211 is equal to gas flow through the first test valve 213.

This design can ensure the stability of gas flow in the three-way valve 2, avoiding pressure changes caused by unequal gas flow in and out and ensuring the accuracy and stability of test data.

Still refer to FIG. 1. In some other embodiments of this solution, diameter of the manifold 3 is more than 5 times diameter of the first test valve 213. In actual use cases, diameter of the first test valve 213 can be set to 5 mm, and maximum diameter of the manifold 3 can be set to more than 25 mm. Disturbance continues to decrease as flow rate decreases after gas flow from the first test valve 213 flows into the manifold 3. In preferred embodiments, the diameter of the first test valve 213 is about 6 mm, and maximum diameter of the manifold 3 can be set to 60 mm, that is, about 10 times of the diameter of the first test valve 213. Larger diameter ratio can reduce disturbance to greater extent and improve measurement accuracy. With the diameter of the manifold 3 increased, the impact caused by convergence of gases from multiple paths is avoided when the test tooling is working, ensuring the stability of gas flow and reducing gas disturbance in the manifold 3. Thereby the measurement accuracy is improved.

In one further embodiment of this solution, the manifold 3 includes a manifold chamber 31, and diameter of the manifold chamber 31 is more than 5 times the diameter of the first test valve 213. In actual use cases, the diameter of the first test valve 213 can be set to 5 mm, and the manifold chamber 31 of the manifold 3 is set as a cylinder, and diameter of circle of the cylinder is more than 25 mm. Other pipelines, such as pipeline used to connect the manifold chamber 31 and a test end, of the manifold 3 can be set to diameter comparable to that of the first test valve 213. Disturbance continues to decrease as flow rate decreases after gas flow from the first test valve 213 flows into the manifold 3. In preferred embodiments, the diameter of the first test valve 213 is about 6 mm, and the manifold chamber 31 of the manifold 3 is set as a cylinder, and diameter of circle of the cylinder is 60 mm, that is, about 10 times of the diameter of the first test valve 213. Setting the manifold chamber 31 with larger diameter ratio can reduce greater disturbance to greater extent and improve measurement accuracy.

With a manifold chamber 31 of a large diameter provided in the manifold 3, design requirements for size of other pipelines of the manifold 3 can be reduced. The foregoing solution can reduce the impact caused by convergence of gases from multiple paths, ensuring the stability of gas flow and reducing gas disturbance in the manifold 3. Thereby the measurement accuracy is improved.

Still refer to FIG. 1. In some other embodiments of this solution, a plurality of interfaces 1 can be provided, and at least as many three-way valves 2 as the interfaces 1 are provided, where each of the three-way valves 2 includes a cut-in valve, a vent valve and a test valve, the cut-in valve of each three-way valve 2 is configured to connect to a respective interface 1, the vent valve of each three-way valve 2 is configured to let in atmospheric air and is able to open and close, and the test valve of each three-way valve 2 is configured to connect to the manifold 3. The plurality of interfaces 1 and the plurality of three-way valves 2 are provided in the same way as the foregoing two interfaces 1 and two three-way valves 2. The interface 1 is connected to a negative pressure suction nozzle of the device under test. When the device has multiple negative pressure suction nozzles under test, multiple corresponding interfaces 1 can be provided. Another end of each interface 1 is connected to a cut-in valve of a corresponding three-way valve 2, and a vent valve of the corresponding three-way valve 2 lets in atmospheric air, and all test valves are connected to the manifold 3 and finally connected to the sensor 4 through the manifold chamber 31.

Operating mode in the case of a plurality of interfaces 1 and a plurality of three-way valves 2 is similar to the operating mode in the case of two interfaces 1, where the plurality of interfaces 1 can work in turn. When different gas paths need to be tested, the valves are controlled such that a valve of a three-way valve 2 corresponding to a gas path under test is closed and valves letting in atmospheric air of the other gas paths are open. If the gas path of the device under test is able to produce negative pressure, air pressure in the three-way valve 2 is reduced and there is gas flowing through a flowmeter. In this way, whether air pressure in the current gas path of the device under test is normal can be measured. When it is necessary to switch to testing another gas path, still, a valve letting in atmospheric air of a three-way valve 2 corresponding to the switched-to gas path changes to be closed, and then air pressure of the corresponding three-way valve 2 is reduced when the switched-to gas path is able to work properly. The provision of a plurality of interfaces 1 and a plurality of three-way valves 2 allows the test assembly to connect to more negative pressure ports of the device under test at the same time, improving the test efficiency.

Figure 3:
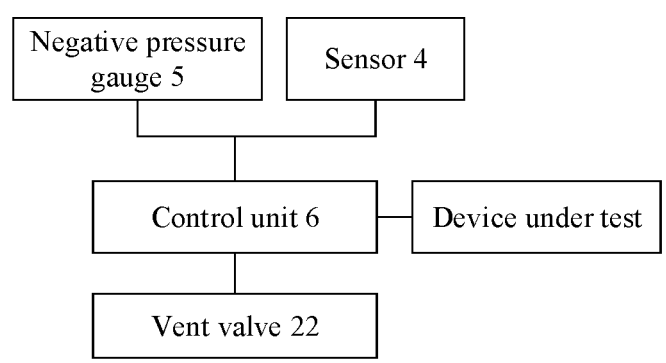
FIG. 3 is a diagram of a connection relationship of a control unit according to an embodiment of this application.

Refer to FIG. 1 and FIG. 3. In some other embodiments of this solution, a control unit 6 is included, where the control unit 6 is configured to control the vent valve of each three-way valve 2 to open and close. When the vent valve of each three-way valve 2 opens, the three-way valve 2 is open to the atmosphere and its test valve is unable to work. The control unit 6 can coordinate the operating sequence of gas paths. For example, the control unit 6 controls the vent valves of different three-way valves 2 to start in turn by using a time division multiplexing program compiled. In some other embodiments, the control unit 6 can further receive starting signals of different negative pressure suction nozzles of the device under test and control operation of corresponding three-way valves 2 in the test assembly according to the received starting signals, for example, closing the vent valve of the three-way valve 2 and opening the vent valves of other three-way valves 2. With the control unit 6 used to control the vent valves of the three-way valves 2 to open and close, switching between the operating states of different test valves can be realized, thus achieving time division multiplexing for test of multiple gas paths.

Still refer to FIG. 1. In another embodiment of this solution, a negative pressure gauge 5 is further included, where the negative pressure gauge 5 is connected to the test end of the sensor 4. The negative pressure gauge 5, also known as a vacuum pressure gauge, is a gauge used to measure pressure less than atmospheric pressure with atmospheric pressure as reference. Vacuum pressure gauges are suitable for measurement of vacuum pressure of liquids and gases that do not explode, crystallize, or solidify, and do no corrode copper or copper alloys. Vacuum pressure gauges are widely used in gas transmission, pipeline liquids and closed containers to measure pressure of various liquids, gases, vapors and other media that are non-corrosive, non-explosive, non-crystalline, and non-solidified, for example, in various industrial automatic control environments, involving petroleum pipelines, water conservancy and hydropower, railroad transportation, intelligent construction, automatic control in production, aerospace, military, petrochemical engineering, oil well, electric power, ship, machine tool, pipeline air supply, vacuum equipment and many other industries.

With the negative pressure gauge 5 connected to the test end, the gas in the manifold 3 can also be connected to the negative pressure gauge 5 for testing negative pressure. Thus, the technical effect of displaying a negative pressure value of the gas path is achieved. Switching to corresponding gas paths according to control of a control module can further achieve the technical effect of testing specific negative pressure values of different negative pressure suction nozzles.

In order to better load the test assembly for testing, in some other embodiments, a box 7 is included, where the test assembly according to any one of the foregoing embodiments is disposed inside the box 7. The box 7 herein is used for packaging and has a specific shape, for example, cuboid, cube, or cylinder. In some embodiments, a test assembly with dual gas paths/dual three-way valves 2 may be disposed inside the box 7, and with the box 7 used for carriage, whether negative pressure suction nozzles of two devices under test are able to work properly can be tested at the same time. The box 7 can alternatively carry a test assembly having more than three gas paths and more than three three-way valves 2, and with the box 7 used for carriage, whether negative pressure suction nozzles of a plurality of devices under test are able to work properly can be tested at the same time.

Loading the test assembly into the box 7 enables components of the test assembly to be fixed relative to the box 7, achieving the technical effect of protecting the components from being damaged. Meanwhile, the box 7 being used for uniform packaging also facilitates the convenience of carrying.

In some other embodiments of this solution, a box wall of the box 7 further includes openings 71 and gas-guiding pipes, where the openings 71 are connected to the interfaces 1 via the gas-guiding pipes. Here, the openings 71 may be holes or cavities in the box wall. Externally, the openings 71 are configured to connect to the device under test, for example, connected to negative pressure suction nozzles of the device under test. Internally, the openings 71 are configured to connect to different interfaces 1, for example, connected to the interfaces 1 of the test assembly via the gas-guiding pipes. In some other embodiments, the gas-guiding pipe may have one end connected to the interface 1 and the other end passing directly through the opening 71 and connected to the device under test, or may simply be connected to the opening 71.

The provision of the openings 71 and the gas-guiding pipes allows working sites of different interfaces 1 to correspond to different openings 71. In actual use, it is more convenient for a user to manually carry out the connection. The openings 71 may be connected to connecting pipes of different interfaces 1 of the device under test. With the connecting pipes connected according to an association mapping, measurement for different interfaces 1 of the device under test can be performed in turn. The foregoing solution makes it easy for a user to connect the device under test. Note information such as bar codes and numbers may be provided at the openings 71 to note the user so as to avoid connection errors.

Continue to refer to FIG. 2. In some other embodiments of this solution, more than two test assemblies are disposed inside the box 7. Each test assembly has multiple interfaces 1 connected to multiple three-way valves 2 and one same sensor 4, thus achieving the technical effect of saving sensors 4. At maximum, up to 24 interfaces 1 and 24 three-way valves 2 can be connected to one sensor 4 at the same time. In one same box 7, alternatively, 2 to 3 test assemblies may be disposed, in which case test tasks for tens of interfaces 1 can be processed at the same time. In conclusion, designing multiple test assemblies can greatly improve the test efficiency of the test tooling.

Refer to FIG. 1 to FIG. 3. According to some embodiments of this application, this application provides a test assembly, including at least two interfaces 1 and two three-way valves 2. A cut-in valve 21 of the three-way valve 2 is connected to the interface 1, a vent valve 22 of the three-way valve 2 lets in atmospheric air and is controlled by a control unit 6 to open and close, and a test valve 23 of the three-way valve 2 is connected to a manifold 3 provided with a manifold chamber 31 with a large diameter and is then connected to a sensor 4 and a negative pressure gauge 5. The sensor 4 and the negative pressure gauge 5 are communicatively connected to the control unit 6, and the control unit 6 can also be connected to a device under test so as to synchronously control the device under test and the vent valves 22. A box 7 may further be provided which houses the test assembly to form a portable test tooling, and the box is provided with openings 71 to connect the device under test. The test assembly provided as above achieves the effect of testing many interfaces 1 by one sensor 4.

In conclusion, it should be noted that the above embodiments are merely intended for describing the technical solutions of this application rather than for limiting this application. Although this application is described in detail with reference to the foregoing embodiments, persons of ordinary skill in the art should understand that they may still make modifications to the technical solutions described in the foregoing embodiments or make equivalent replacements to some or all technical features thereof without departing from the scope of the technical solutions of the embodiments of this application. Such modifications or replacements shall all be covered in the scope of the claims and specification of this application. In particular, as long as there is no structural conflict, the various technical features mentioned in the embodiments can be combined in any manners. This application is not limited to the specific embodiments disclosed in this specification, but includes all technical solutions falling within the scope of the claims.

What is claimed is:

1. A test assembly, characterized by comprising:
    interfaces, wherein one end of the interfaces is configured to connect to a device under test, and the interfaces comprise at least a first interface and a second interface;
    a first three-way valve, wherein the first three-way valve comprises a first cut-in valve, a first vent valve, and a first test valve, one end of the first interface is connected to the first cut-in valve, and the first vent valve lets in atmospheric air and is able to open and close;
    a second three-way valve, wherein the second three-way valve comprises a second cut-in valve, a second vent valve, and a second test valve, one end of the second interface is connected to the second cut-in valve, and the second vent valve lets in atmospheric air and is able to open and close;
    a manifold, wherein the first test valve is connected to the manifold and the second test valve is connected to the manifold; and
    a sensor, wherein the manifold is connected to a test end of the sensor; and, wherein the test assembly further comprises a control unit configured to control the vent valve of each three-way valve to open and close, wherein when the control unit controls the first vent valve to open, the control unit controls the second vent valve to close, and when the control unit controls the second vent valve to open, the control unit controls the first vent valve to close.

2. The test assembly according to claim 1, characterized in that the first cut-in valve and the first test valve have equal diameters.

3. The test assembly according to claim 1, characterized in that a diameter of the manifold is more than 5 times a diameter of the first test valve.

4. The test assembly according to claim 3, characterized in that the manifold comprises a manifold chamber, and a diameter of the manifold chamber is more than 5 times the diameter of the first test valve.

5. The test assembly according to claim 1, characterized by comprising a plurality of the interfaces and at least as many three-way valves as the interfaces, wherein each of the three-way valves comprises a cut-in valve, a vent valve, and a test valve, the cut-in valve of each three-way valve is configured to connect to a respective interface, the vent valve of each three-way valve is configured to let in atmospheric air and is able to open and close, and the test valve of each three-way valve is configured to connect to the manifold.

6. A test tooling, characterized by comprising a box, wherein the test assembly according to claim 1 is disposed inside the box.

7. The test tooling according to claim 6, characterized in that a box wall of the box further comprises openings and gas-guiding pipes, wherein the openings are connected to the interfaces via the gas-guiding pipes.

8. The test tooling according to claim 6, characterized in that more than two such test assemblies are disposed inside the box.

* * * * *